United States Patent
Chen et al.

(10) Patent No.: US 7,741,787 B2
(45) Date of Patent: Jun. 22, 2010

(54) LIGHT-EMITTING DIODE DRIVING CIRCUIT

(75) Inventors: Kai-Ji Chen, Sinshih Township, Tainan County (TW); Chin-Lung Wu, Sinshih Township, Tainan County (TW)

(73) Assignee: Himax Analogic, Inc., Sinshih Township, Tainan County (TW)

( * ) Notice: Subject to any disclaimer, the term of this patent is extended or adjusted under 35 U.S.C. 154(b) by 322 days.

(21) Appl. No.: 12/101,327

(22) Filed: Apr. 11, 2008

(65) Prior Publication Data

US 2009/0200959 A1 Aug. 13, 2009

(30) Foreign Application Priority Data

Feb. 12, 2008 (TW) .............................. 97104843 A

(51) Int. Cl.
*H05B 37/02* (2006.01)
*H05B 41/36* (2006.01)
(52) U.S. Cl. ..................... 315/224; 315/225; 315/291
(58) Field of Classification Search ............. 315/209 R, 315/210, 224, 225, 227 R, 228, 246, 283, 315/287, 291; 323/318, 349, 355, 356
See application file for complete search history.

(56) References Cited

U.S. PATENT DOCUMENTS

| 2008/0012507 A1* | 1/2008 | Nalbant ....................... 315/306 |
| 2008/0150449 A1* | 6/2008 | Wang et al. .................. 315/291 |
| 2009/0160422 A1* | 6/2009 | Isobe et al. .................. 323/349 |

* cited by examiner

*Primary Examiner*—Thuy Vinh Tran
(74) *Attorney, Agent, or Firm*—Thomas, Kayden, Horstemeyer & Risley

(57) ABSTRACT

A light-emitting diode driving circuit includes a control circuit, a transistor switch and a compensating circuit. The control circuit receives an oscillating signal to generate a pulse drive signal. The transistor switch is activated by the pulse drive signal such that an inductor is charged by an input voltage, in which the inductor is arranged to deliver an inducting current to at least one light-emitting diode when the transistor switch is deactivated. The compensating circuit is coupled between the control circuit and a capacitor provided for reducing ripples of an output voltage corresponding to the inducting current. The compensating circuit performs a charging and discharging operation along with the capacitor when controlled by a dimming control signal provided to control brightness of the light-emitting diode.

9 Claims, 1 Drawing Sheet

LIGHT-EMITTING DIODE DRIVING CIRCUIT

RELATED APPLICATIONS

This application claims priority to Taiwan Application Serial Number 97104843, filed Feb. 12, 2008, which is herein incorporated by reference.

BACKGROUND

1. Field of Invention

The present invention relates to a driving circuit. More particularly, the present invention relates to a light-emitting diode (LED) driving circuit.

2. Description of Related Art

Generally, a light-emitting diode (LED) driving circuit, provided for display applications, converts an input voltage into an output voltage required to drive one or several connected light-emitting diodes. The brightness of the light-emitting diodes can vary when using the pulse width modulation (PWM) dimming method.

However, when the PWM dimming method is applied, ripples are generated in the output voltage of the light-emitting diode driving circuit. In addition, a diode current flowing through the light-emitting diodes varies according to the PWM dimming method and also causes the ripples, so a closed-loop transfer function of the light-emitting diode driving circuit is affected by the ripples and cannot be changed quickly. Moreover, the closed-loop transfer function is also affected by a slew rate of an error amplifier that is often employed in the light-emitting diode driving circuit, such that the voltage of a compensating capacitor cannot be changed quickly enough to reduce the ripples. Therefore, the ripples of the output voltage cannot be minimized and the light-emitting diode driving circuit cannot be stably operated.

SUMMARY

In accordance with one embodiment of the present invention, a light-emitting diode driving circuit is provided. The light-emitting diode driving circuit includes a control circuit, a transistor switch and a compensating circuit. The control circuit receives an oscillating signal to generate a pulse drive signal. The transistor switch is activated by the pulse drive signal such that an inductor is charged by an input voltage, in which the inductor is arranged to deliver an inducting current to at least one light-emitting diode when the transistor switch is deactivated. The compensating circuit is coupled between the control circuit and a capacitor provided for reducing ripples of an output voltage corresponding to the inducting current. The compensating circuit performs a charging and discharging operation along with the capacitor when controlled by a dimming control signal provided to control brightness of the light-emitting diode.

For the foregoing embodiment of the present invention, the light-emitting diode driving circuit can change the loop transfer function thereof more quickly when controlling the brightness of the light-emitting diodes, so as to decrease load transients and reduce ripples of the output voltage of the light-emitting diode driving circuit, such that the light-emitting diode driving circuit can have a better phase margin.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawing as follows:

The drawing shows a light-emitting diode driving circuit according to one embodiment of the present invention.

DESCRIPTION OF THE PREFERRED EMBODIMENTS

Figure 1:
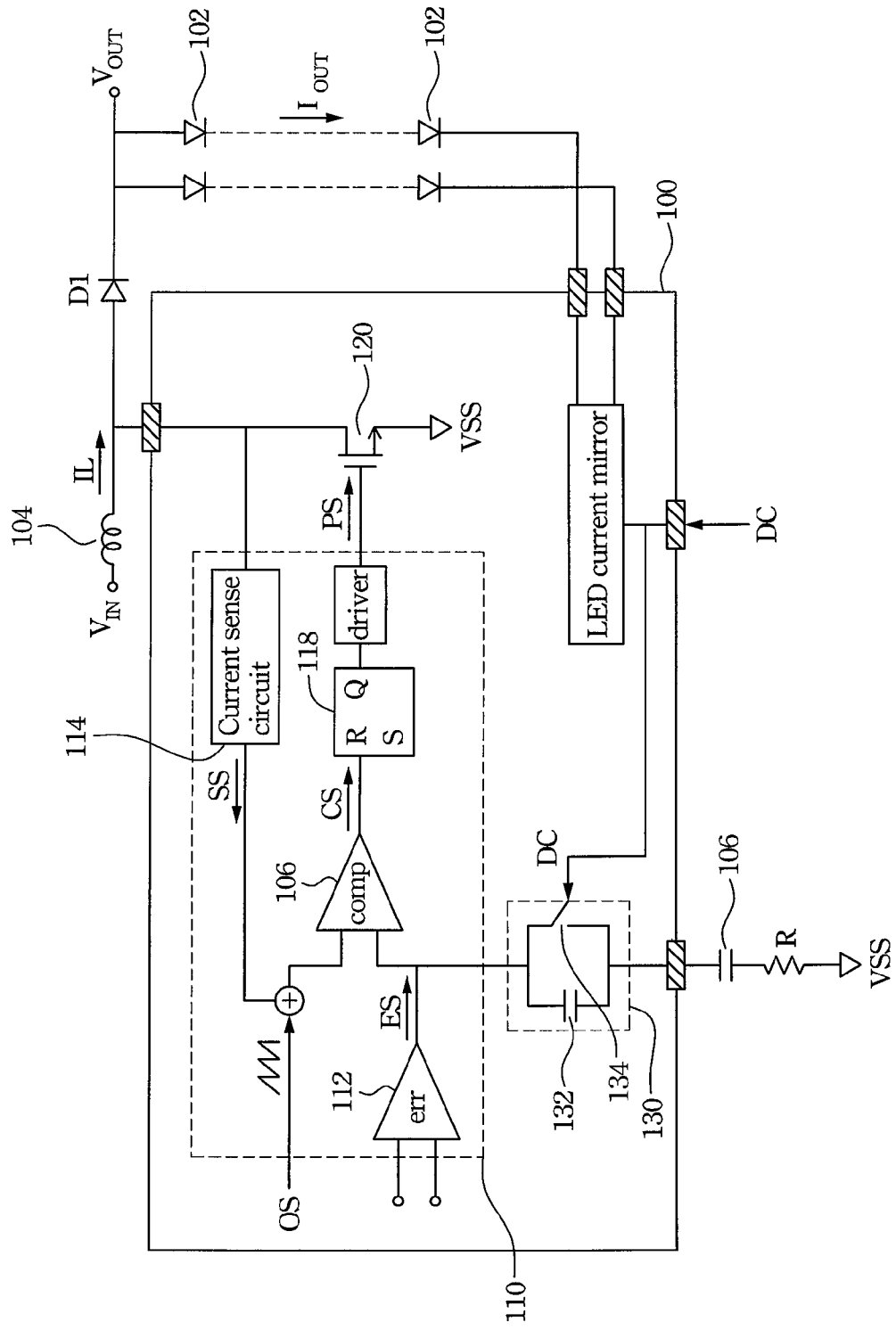

The drawing shows a light-emitting diode driving circuit according to one embodiment of the present invention. The light-emitting diode driving circuit 100 converts an input voltage $V_{IN}$ into an output voltage $V_{OUT}$ used for driving one or several connected light-emitting diodes (LED) 102, in which the light-emitting diode driving circuit 100 can be located in an integrated circuit (IC). The light-emitting diode driving circuit 100 includes a control circuit 110, a transistor switch 120 and a compensating circuit 130. The control circuit 110 receives an oscillating signal OS to generate a pulse drive signal PS to be applied to the transistor switch 120. The duty ratio of the transistor switch 120 determines the proportional relationship between the output voltage $V_{OUT}$ and the input voltage $V_{IN}$. When the pulse drive signal PS activates the transistor switch 120, the input voltage $V_{IN}$ charges an inductor 104 that is outside and connected to the light-emitting diode driving circuit 100. When the pulse drive signal PS deactivates the transistor switch 120, the inductor 104 delivers an inducting current IL to the light-emitting diodes 102, and a diode current $I_{OUT}$ flowing through the light-emitting diodes 102 is generated accordingly. The brightness of the light-emitting diodes 102 varies according to the diode current $I_{OUT}$ flowing through themselves. The compensating circuit 130 is coupled between the control circuit 110 and an outside capacitor 106, which is connected to the light-emitting diode driving circuit 100 and provided for reducing ripples of the output voltage $V_{OUT}$ corresponding to the inducting current IL. The compensating circuit 130 performs a charging and discharging operation along with the outside capacitor 106 when controlled by a dimming control signal DC, e.g. pulse width modulation (PWM) dimming signal, that is provided to control brightness of the light-emitting diodes 102.

The compensating circuit 130 further includes a compensating capacitor 132 and a switching unit 134. The compensating capacitor 132 has a first end coupled to the outside capacitor 106 and a second end coupled to the control circuit 110. The switching unit 134 is connected in parallel with the compensating capacitor 132 and controlled by the dimming control signal DC. The control circuit 110 further includes an error amplifier 112, a current sense circuit 114, a comparator 116 and a latch 118. The error amplifier 112 has an output terminal coupled to the second end of the compensating capacitor 132 and outputs an error signal ES. The current sense circuit 114 outputs a sense signal SS according to the inducting current IL. The comparator 116 compares the oscillating signal OS, which is added with the sense signal SS, to the error signal ES output from the error amplifier 112, so as to output a comparison signal CS to trigger a reset input terminal R of the latch 118. The latch 118 receives the comparison signal CS to trigger the pulse drive signal PS into a high level state so as to activate the transistor switch 120.

When the current sense circuit 114 detects that the inducting current IL is approaching zero, the transistor switch 120 is activated and the inductor 104 is charged. The transistor switch 120 remains activated until the inducting current IL has reached a maximum value. At that moment, the transistor switch 120 is deactivated, and the inducting current IL flows to the light-emitting diodes 102. The cycle repeats whenever the current sense circuit 114 detects that the inducting current IL is approaching zero.

When the light-emitting diode driving circuit 100 does not receive the dimming control signal DC, the switching unit 134 is not enabled by the dimming control signal DC and performs short-circuited at the same time. Accordingly, the light-emitting diode driving circuit 100 uses only the outside capacitor 106 to perform the charging and discharging operation. On the other hand, when the light-emitting diode driving circuit 100 receives the dimming control signal DC to control the brightness of the light-emitting diodes 102, the switching unit 134 is enabled by the dimming control signal DC and performs open-circuited at the same time. At that moment, the compensating capacitor 132 performs the charging and discharging operation along with the outside capacitor 106, such that the output voltage of the error amplifier 112, whose output terminal is coupled to the compensating capacitor 132, is clamped to a certain level when the light-emitting diode driving circuit 100 instantaneously receives the dimming control signal DC. The charging and discharging operation of the light-emitting diode driving circuit 100 also becomes faster accordingly. Furthermore, the load transients can be decreased and the ripples of the output voltage $V_{OUT}$ can be reduced as well.

For the foregoing embodiment of the present invention, the light-emitting diode driving circuit can change the loop transfer function thereof more quickly when controlling the brightness of the light-emitting diodes, so as to decrease load transients and reduce ripples of the output voltage of the light-emitting diode driving circuit, such that the light-emitting diode driving circuit has a better phase margin and is stably operated.

As is understood by a person skilled in the art, the foregoing embodiment of the present invention is illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A light-emitting diode driving circuit, comprising:
    a control circuit for receiving an oscillating signal to generate a pulse drive signal;
    a transistor switch activated by the pulse drive signal, such that an inductor is charged by an input voltage, wherein the inductor is arranged to deliver an inducting current to at least one light-emitting diode when the transistor switch is deactivated; and
    a compensating circuit coupled between the control circuit and a capacitor provided for reducing ripples of an output voltage corresponding to the inducting current, the compensating circuit performing a charging and discharging operation along with the capacitor when controlled by a dimming control signal provided to control brightness of the light-emitting diode.

2. The light-emitting diode driving circuit as claimed in claim 1, wherein the compensating circuit further comprises:
    a compensating capacitor having a first end coupled to the capacitor and a second end coupled to the control circuit; and
    a switching unit connected in parallel with the compensating capacitor.

3. The light-emitting diode driving circuit as claimed in claim 2, wherein the switching unit is open-circuited when enabled by the dimming control signal.

4. The light-emitting diode driving circuit as claimed in claim 2, wherein the switching unit is short-circuited when not enabled by the dimming control signal.

5. The light-emitting diode driving circuit as claimed in claim 2, wherein the control circuit further comprises:
    an error amplifier having an output terminal coupled to the second end of the compensating capacitor.

6. The light-emitting diode driving circuit as claimed in claim 5, wherein an output voltage of the error amplifier is clamped to a certain level when the switching unit is open-circuited.

7. The light-emitting diode driving circuit as claimed in claim 5, wherein the control circuit further comprises:
    a current sense circuit for outputting a sense signal according to the inducting current; and
    a comparator for comparing the oscillating signal added with the sense signal to an error signal output from the error amplifier to output a comparison signal.

8. The light-emitting diode driving circuit as claimed in claim 7, wherein the control circuit further comprises:
    a latch for receiving the comparison signal to trigger the pulse drive signal into a high level state.

9. The light-emitting diode driving circuit as claimed in claim 1, wherein the light-emitting diode driving circuit is located in an integrated circuit.

* * * * *